UNITED STATES PATENT OFFICE.

NIELS C. CHRISTENSEN, OF SALT LAKE CITY, UTAH, ASSIGNOR TO METALLURGIC IMPROVEMENT CORPORATION, OF SALT LAKE CITY, UTAH, A CORPORATION OF UTAH.

PROCESS OF TREATING COPPER ORES BY SULFITIZATION AND FLOTATION.

1,286,532. Specification of Letters Patent. Patented Dec. 3, 1918.

No Drawing. Application filed April 3, 1918. Serial No. 226,522.

*To all whom it may concern:*

Be it known that I, NIELS C. CHRISTENSEN, a citizen of the United States, residing at No. 637 East Ninth South street, in Salt Lake City, in the county of Salt Lake and State of Utah, have invented a new Process of Treating Copper Ores by Sulfitization and Flotation, of which the following is a specification.

This invention relates to a new process for the treatment of copper ores. It is particularly adapted to ores containing the copper in an oxidized condition, but is also applicable to ores in which part of the copper is oxidized and part sulfid. It may also be applied to sulfid ores which have been given a preliminary roast. My process recovers the copper from these ores by a new combination of chemical and mechanical steps making use of hitherto unknown and unused chemical reactions and of hitherto unknown and unused properties of some copper compounds.

The principal compound whose properties are utilized in the process is the red cupro-cupric sulfite, such as is formed by boiling off the excess $SO_2$ from an $SO_2$ solution in which oxidized copper compounds have been dissolved or by the action of $SO_2$ and moisture upon the oxidized copper minerals at a suitable temperature. This red crystalline precipitate possesses the property of "flotation" in a very high degree and when an oily froth is formed in a pulp containing this compound, the sulfite is carried to the surface with the froth, giving a perfect separation from the gangue material. The froth is colored a bright red by the precipitate and gives an excellent indication of the working of the process in practical operation. This remarkable property of the cupro-cupric sulfite has never been known or used before my discovery thereof.

The other compound whose properties are utilized, though to a much smaller degree and of relatively much less importance, is the basic copper sulfate formed when the copper is precipitated from a warm copper sulfate solution by the addition of $CaCO_3$. This flocculent green precipitate also possesses the property of flotation and is carried to the surface by the froth, giving it a light green color. The action in this case is slower than with the sulfite due to the difference in the physical condition of the two precipitates.

Two newly discovered chemical reactions are utilized in the process. The first and most important of these is that all the copper is precipitated from the sulfite solution as cupro-cupric sulfite by boiling off the excess $SO_2$, if metallic copper is present in the required amount. The second is that the formation of $CuSO_4$ is prevented and all the $SO_2$ driven off from the cupro-cupric sulfite if this precipitate is heated without access of air in the presence of metallic copper.

The method of utilizing these properties and reactions and their combination into a complete and efficient process are given more fully in the following general description of my process.

Two methods of applying my process may be used. They differ only in the method of "sulfitizing" the ore preparatory to the separation by flotation. In the first, the ore is ground to a suitable mesh and agitated with an $SO_2$ solution to dissolve the copper in the ore. The solution of the copper takes place according to the following chemical equation, wherein the expression "Cu‘O’" is used to indicate the combined form of copper present in the ore.

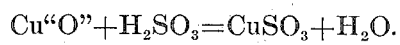

$$Cu\text{``O''}+H_2SO_3=CuSO_3+H_2O.$$

The solution of the copper should be brought about with the formation of as little $CuSO_4$ as possible and is best carried out by using a relatively concentrated $SO_2$ solution and by agitating the mixture of ore and solution by passing pure $SO_2$ gas through the pulp during the solution process. This $SO_2$ gas is obtained from the boiling operation and the roasting operation described below. The gases from which the $SO_2$ solution is made should be freed from any $SO_3$ or sulfates before being absorbed to make the mill solution. The mill solution should also be kept free from sulfates as the precipitation of the copper from the sulfate in a satisfactory condition is difficult. If the solution becomes depleted in $SO_2$ the following reaction may take place which should be avoided:

$$Cu\text{``O''}+3CuSO_3=Cu_2SO_3,CuSO_3+CuSO_4$$

After the Cu has been brought into solution, finely divided metallic copper is added to the pulp in sufficient quantity and the pulp heated and the excess $SO_2$ driven off. This brings about the precipitation of the copper according to the following chemical equation:

$$2CuSO_3 + Cu = Cu_2SO_3, CuSO_3$$

The copper should be added in a very finely divided condition in order to avoid the use of a very large excess of copper as the cupro-cupric sulfite forms a protecting coating on any large particles which prevents further action. The finely divided copper is produced in the process as later described.

If there is any $CaCO_3$ present in the ore it will precipitate the copper from any $CuSO_4$ formed as the cupro-cupric sulfite as shown below:

$$CaCO_3 + 2H_2SO_3 = Ca(HSO_3)_2 + C_2CO_3$$
$$CuSO_4 + Ca(HSO_3)_2 =$$
$$CuSO_3 + CaSO_4 + H_2SO_3$$
$$4CuSO_3 = Cu_2SO_3, CuSO_3 + CuSO_4 + SO_2$$

and in some cases, where it is impossible to prevent the formation of some $CuSO_4$, it is advantageous to add a small amount of $CaCO_3$ in order to secure complete precipitation of the copper.

All the copper might be precipitated as the cupro-cupric sulfite by adding sufficient $CaCO_3$. In this way but one-third of the copper would then pass through the form of sulfate and there would be a large loss of $SO_2$ in the $CaSO_4$ formed. The concentrate would also be contaminated with the $CaSO_4$ as it is practically impossible to separate the $Cu_2SO_3, CuSO_3$ from the $CaSO_4$ when precipitated together. The sulfite either coats the $CaSO_4$ or forms some combination with it, thus preventing a clean separation. This method would therefore not be used unless $SO_2$ could be obtained very cheaply and unless the grade of concentrate was of very little importance. This might be the case in the immediate vicinity of a smelter, but would be very unusual. The use of a large excess of $CaCO_3$ should be avoided as any calcium sulfite left in the pulp inhibits flotation.

In some cases it may be advantageous to add the necessary $CaCO_3$ after the excess $SO_2$ has been driven off. In this event the copper is precipitated as the basic sulfate as shown below $$4CuSO_4 + 3CaCO_3 + 3H_2O =$$
$$3Cu(OH)_2, CuSO_4 + 3CaSO_4 + 3CO_2$$

This precipitate will be saved with the sulfite in the next step of the process. If proper precautions are taken practically no $CuSO_4$ will be formed and in this case the precipitation of the copper as the cupro-cupric sulfite will be practically complete without the addition of any other reagent than the finely divided metallic copper. From the foregoing description it will be apparent that a number of slight variations may be used in the application of the process to any particular ore. If no copper sulfate is formed the use of any calcium sulfite or calcium carbonate may be omitted. If the formation of $CuSO_4$ is unavoidable on account of the nature of the ore, it will be necessary to use a lime compound, and in this case the copper may be precipitated either as the cupro-cupric sulfite or as the basic sulfate depending on the point at which the $CaCO_3$ is added. If the lime is to be used in the form of calcium sulfite, it would be advantageous to add it at the end of the $SO_2$ absorption system in order to cut off any escape of $SO_2$. If much $CuSO_4$ was formed with some ores it might be advantageous to filter off the $CuSO_4$ solution and precipitate the copper from it separate from the remainder, but this would be a very exceptional case.

After the precipitation of the copper, the ore and precipitate are separated from the barren solution in a suitable thickener and then diluted with the proper amount of water and sent to the flotation step of the process. The hot barren solution is freed from all sulfates by the addition of $CaCO_3$ and cooled and returned to the absorption department to make more $SO_2$ solution for use in dissolving the copper.

The pulp containing the cupro-cupric sulfite is now treated as described later for the separation of the copper precipitate.

The second method of "sulfitizing" the ore differs from the foregoing in the fact that a hot solution is used mainly in the process and in that the copper is not all brought into solution before being precipitated, but is precipitated almost as rapidly as it is brought into solution. This second method makes it possible to use a comparatively thick pulp and avoids the loss of much heat in the process in this way. In the first method it is necessary to use a comparatively large volume of solution as the $SO_2$ solution will not hold more than about 2% copper. In the second case as little solution as it is possible with which to agitate the ore may be used. As will be apparent from the following description, the second method possesses some advantages over the first in practical operation.

The ore is ground to suitable mesh. If ground wet, as little water as is consistent with good grinding should be used and if ground dry only sufficient water to secure good agitation is added. The required amount of finely divided copper is added to the pulp and the pulp is then heated and agitated with $SO_2$ gas. The agitation should preferably be comparatively violent and the $SO_2$ gas as concentrate as possible. Precautions should be taken to exclude any air so as to prevent oxidation, and the gases and solution should be freed from $SO_3$ and sulfates before being used, as before mentioned. The $SO_2$ gases used in the agitation will be mainly those secured from the roasting operation later described. To make up for losses, $SO_2$ may be supplied from a suitable absorption system to which $SO_2$ is supplied from a sulfur burner or sulfid roaster. The temperature of the pulp during "sulfitization" should be maintained somewhat below the boiling point of water. The action of the hot water and $SO_2$ gas in the presence of the metallic copper is to convert the copper minerals to the cupro-cupric sulfite. The action may be represented by the following chemical equation:

$$2Cu\text{``}O\text{''} + 2SO_2 + Cu = Cu_2SO_3, CuSO_3$$

The different steps in the chemical process are probably as follows:

$$Cu\text{``}O\text{''} + H_2SO_3 = CuSO_3 + H_2O$$
$$2CuSO_3 + Cu = Cu_2SO_3, CuSO_3$$

If no metallic copper were present, one-fourth of the copper would be left in solution as sulfate, as shown below—

$$4Cu\text{``}O\text{''} + 3H_2SO_3 = 3H_2O + Cu_2SO_3, CuSO_3 + CuSO_4$$

which reaction may be a contraction of the two following:—

$$3Cu\text{``}O\text{''} + 3H_2SO_3 = 3CuSO_3 + 3H_2O$$
$$Cu\text{``}O\text{''} + 3CuSO_3 = Cu_2SO_3, CuSO_3 + CuSO_4$$

This action should be prevented by the addition of sufficient metallic copper and thorough agitation of the pulp. Only in the exceptional case mentioned in the first method above, in which the loss of $SO_2$ and the grade of the concentrate are of little importance, should this reaction be allowed to take place. In this exceptional case the complete precipitation of the copper will be brought about by the addition of $CaCO_3$ at some point of the process, as described in this case in the first method.

Sufficient time should be allowed in the sulfitizing treatment to convert all the copper minerals to the cupro-cupric sulfite or to coat the mineral particles with the sulfite. This latter effect may occur in slight amount but is relatively unimportant. If no metallic copper is present it results in the formation of $CuSO_4$ as shown below:

$$Cu\text{``}O\text{''} + 3CuSO_3 = Cu_2SO_3, CuSO_3 + CuSO_4$$

but the addition of the copper prevents the formation of the sulfate. There is no advantage to the process in attempting to make use of this coating effect even if it might be carried out efficiently.

After the copper has been converted to the cupro-cupric sulfite the excess $SO_2$ should be driven out of the pulp. This is best carried out by passing steam through the pulp and agitating it thoroughly.

As is obvious, these two methods of carrying out the sulfitizing treatment are merely the extremes of a great many possible variations and any variation between these two extremes may be used to bring about the "sulfitization" of the copper. The treatment may vary both as to the amount of water used and as to the time of treatment, cold and hot. The exact variation used will depend upon the design of the plant.

Following the sulfitizing treatment, the warm pulp carrying the copper precipitate is treated in the following manner to separate the copper precipitate from the gangue: A small quantity of suitable oily frothing agent or agents or combination of suitable oils or fats and frothing agents are added to the pulp and thoroughly mixed therewith, and the pulp is diluted with water to the proper consistency. The pulp is then thoroughly aerated and agitated in such a manner as to form a froth therein. The froth or mixture of air bubbles picks up the cupro-cupric sulfite precipitate and carries it to the surface of the pulp where it may be readily removed and thus separated from the barren material of the ore. This action is extremely efficient and thorough and gives a practically perfect separation of the copper from the gangue. The action as observed in the flotation cell is rather beautiful on account of the bright red froth which overflows from the machine. If some of the copper has been precipitated as the basic sulfate the froth will be lighter in color. All metallurgists are now so familiar with the "sulfid" flotation process that an elaborate description of the separation of the cupro-cupric sulfite from the gangue is superfluous and entirely unnecessary. The emulsification and aeration of the pulp and the formation and removal of the froth in my process may be carried out by the mechanical beating of air into the pulp or by passing air through a porous membrane into the pulp or by a combination of these. The entire "flotation" part of my process may be carried out in any of the different forms of apparatus used in the "sulfid" flotation process, now so widely known and used. The same kinds of oils and frothing agents may in general also be used.

The cupro-cupric sulfite concentrate recovered by flotation is treated for the recovery of the $SO_2$ in one of the following ways: It may be mixed with a reducing agent and heated for a short time and the $SO_2$ driven off as shown below:

$6Cu_2SO_3,CuSO_3+2C = 9Cu_2O+12SO_2+CO_2+CO$ but in this case the $SO_2$ will carry some $CO_2$ and CO and any volatile matter from the reducing agent. If the concentrate is mixed with fine metallic copper and heated the $SO_2$ is driven off as shown below:

$3Cu_2SO_3,CuSO_3+3Cu \rightarrow 6Cu_2O+6SO_2$

This method is well suited to the process as it is necessary to add an excess of copper in the "sulfitizing" part of the process described above and this excess already intimately mixed with the cupro-cupric sulfite may be efficiently used in this treatment. If desired, both copper and carbon may be used to bring about this reaction. This reaction requires but a few minutes at a temperature of 600° as the precipitates are so fine and so intimately mixed. The $SO_2$ thus freed from the copper is used in the agitation of the pulp and to make the $SO_2$ solution used in the sulfitizing treatment.

After the $SO_2$ has been removed from the cupro-cupric sulfite concentrate, as described above, it is further heated with a reducing agent to reduce the $Cu_2O$ to metallic copper for use in converting all the copper in the ore to the cupro-cupric sulfite as described above the reduction of the $Cu_2O$ is very easily brought about, owing to its being in such a very fine condition.

It should be noted that the process theoretically uses up no chemicals except the reducing agent used in the reduction of the $Cu_2O$, as all the $SO_2$ and copper are recovered. The excess metallic copper used to secure complete precipitation of the copper in the sulfitizing treatment is coated with the sulfite and floats readily.

As the process is not in any way dependent upon any particular form of apparatus and as it would obviously be impossible to describe all the different kinds of apparatus which might be used in the "sulfitization" and flotation of the ore, no drawings are shown. The simplicity of the process and the fact that the nomenclature and apparatus to be used are already familiar to all metallurgists makes it extremely easy for any one familiar with the art to use the process.

That the process has a wide field of application will be evident from the following statement of some of its applications.

Ores containing the copper as the carbonate yield very readily to this process. The clean sandstone ores which occur abundantly in certain parts of the western U. S. are especially suited to this treatment. Tests on some of these ores show extractions as high as 99% with only ten minutes sulfitizing treatment.

Ores containing the copper partly as carbonate and partly as sulfid are well suited for treatment by this process, as the oxidized part of the copper is not only saved but the sulfids are cleaned so as to float very readily.

Ores containing the copper partly as red oxid, of which there are many examples in the States of Utah, Colorado and Arizona, etc., are well suited for treatment by this process as the sulfitizing treatment makes possible the flotation of all the copper, whereas a leaching process has difficulty in dissolving more than half of the copper.

Ores containing the copper as a mixture of chalcocite, cuprite, and azurite and malachite are amenable to no other simple form of treatment, but by this process the entire copper content may be saved. Many deposits in S. E. Utah and adjoining portions of Arizona and Colorado have deposits of ore of this character. Sulfid ores are also amenable to this treatment after being given a preliminary roast.

The brief description of the process and its applications possible in the scope of a patent application cannot possibly cover the entire range of possible application of my invention. I therefore do not wish to be limited entirely by the foregoing description, but by its spirit and scope as set forth in the following claims.

In the claims I have used the term "sulfitize" to mean the changing of the copper compounds in the ore to the cupro-cupric sulfite, or the coating of the particles of copper mineral with the cupro-cupric sulfite, as the effect as far as the flotation of the copper is the same in either case. The term flotation is now a term of such common usage as to need no explanation. All metallurgists and many laymen are familiar with the "sulfid" flotation process and with the "flotative" properties of the sulfids, and though the theories of "flotation" may yet be somewhat in dispute, the practical operations of the flotation process in its different forms is now so widely known as to need no explanation. The cupro-cupric sulfite possesses flotative properties similar to the sulfids but these properties of the cupro-cupric sulfite are much more pronounced. I have therefore used the term "flotation" and "flotation process" to cover the method of using these flotative properties in separating the precipitate from the remainder of the ore, which terms are now so familiar as to need no amplification in the claims.

Having described my process, what I claim as new and desire to patent is:

1. The process of treating copper ores which consists in subjecting said ores to the action of sulfur dioxid gas in the presence of water and simultaneously heating said ores.

2. The process of treating copper ores which consists in subjecting said ores together with metallic copper to the action of sulfur dioxid in the presence of water and simultaneously heating said ores and copper.

3. The process of treating copper ores which consists in subjecting said ores to the action of concentrated sulfur dioxid gas in the presence of water and simultaneously heating said ores.

4. The process of treating copper ores which consists in subjecting said ores together with metallic copper to the action of concentrated sulfur dioxid gas in the presence of water and simultaneously heating said ores.

5. The process of treating copper ores which consists in subjecting said ores to the action of concentrated sulfur dioxid free from sulfate forming constituents and in the presence of water and simultaneously heating said ores.

6. The process of treating copper ores which consists in subjecting said ores in the presence of metallic copper to the action of concentrated sulfur dioxid free from sulfate forming constituents and in the presence of water, and simultaneously heating said ores.

7. The process of treating copper ores which consists in subjecting said ores to the action of sulfur dioxid in the presence of water while maintaining said ores at approximately the temperature of boiling water.

8. The process of treating copper ores which consists in subjecting said ores to the action of sulfur dioxid in the presence of water and metallic copper while maintaining said ores at approximately the temperature of boiling water.

9. The process of treating copper ores which consists in subjecting said ores to the action of sulfur dioxid in the presence of water and simultaneously heating said ores, whereby cupro-cupric sulfite is formed, and removing said cupro-cupric sulfite.

10. The process of treating copper ores which consists in subjecting said ores to the action of sulfur dioxid in the presence of water while maintaining said ores at approximately the temperature of boiling water, whereby cupro-cupric sulfite is formed, and removing said cupro-cupric sulfite.

11. The process of treating copper ores which consists in subjecting said ores together with an excess of metallic copper to the action of sulfur dioxid in the presence of water and simultaneously heating said ores, whereby cupro-cupric sulfite is formed, and removing said cupro-cupric sulfite and the excess of metallic copper from the gangue.

12. The process of treating copper ores which consists in subjecting said ores together with an excess of metallic copper to the action of sulfur dioxid in the presence of water while maintaining said ores at approximately the temperature of boiling water, whereby cupro-cupric sulfite is formed, and removing said cupro-cupric sulfite and the excess of metallic copper from the gangue.

13. In the process of treating copper ores wherein the ores are subjected to the action of sulfur dioxid and water, heating the ore pulp in the presence of metallic copper.

14. In the process of treating copper ores wherein a pulp containing copper sulfite is formed, subjecting said pulp to the action of heat in the presence of an excess of metallic copper, thereby forming cupro-cupric sulfite, and removing the cupro-cupric sulfite and the excess of metallic copper from the gangue.

15. In the process of treating copper ores wherein a pulp containing copper sulfite is formed, subjecting the pulp to the action of heat in the presence of an excess of metallic copper, thereby forming cupro-cupric sulfite, removing the cupro-cupric sulfite and metallic copper in intimate admixture from the gangue, and calcining the mixture of cupro-cupric sulfite and copper.

16. In the process of treating copper ores wherein a pulp containing copper sulfite is formed, subjecting said pulp to the action of heat in the presence of an excess of metallic copper, thereby forming cupro-cupric sulfite, removing the cupro-cupric sulfite and the excess of metallic copper in intimate admixture from the gangue, and calcining the mixture of cupro-cupric sulfite and copper in the absence of air.

17. In the process of treating copper ores wherein a pulp containing copper sulfite is formed, subjecting said pulp to the action of heat in the presence of an excess of metallic copper, thereby forming cupro-cupric sulfite and subjecting the pulp to flotation, thereby removing the cupro-cupric sulfite and copper in intimate admixture from the gangue.

18. In the process of treating copper ores wherein a pulp containing copper sulfite is formed, subjecting said pulp to the action of heat in the presence of an excess of metallic copper, thereby forming cupro-cupric sulfite, subjecting the pulp to flotation, thereby removing the cupro-cupric sulfite and copper in intimate admixture from the gangue, and calcining the mixture of cupro-cupric sulfite and copper.

19. The process of treating copper ores which consists in forming a thick aqueous pulp thereof, subjecting said pulp to the action of sulfur dioxid in the presence of metallic copper while maintaining said pulp at a temperature approximately that of boiling water, thereby forming cupro-cupric sulfite therein, and removing the cupro-cupric sulfite from the gangue.

20. The process of treating copper ores which consists in forming a thick aqueous pulp thereof, subjecting said pulp to the action of sulfur dioxid in the presence of an excess of metallic copper while maintaining said pulp at a temperature approximately that of boiling water, thereby forming cupro-cupric sulfite therein, and removing the cupro-cupric sulfite and excess of copper from the gangue.

21. The process of treating copper ores which consists in forming a thick aqueous pulp thereof, subjecting said pulp to the action of sulfur dioxid in the presence of an excess of metallic copper while maintaining said pulp at a temperature approximately that of boiling water, thereby forming cupro-cupric sulfite therein, removing the cupro-cupric sulfite and the excess of copper from the gangue in admixture, and calcining the mixture of cupro-cupric sulfite and copper.

22. The process of treating copper ores which consists in forming a thick aqueous pulp thereof, subjecting said pulp to the action of sulfur dioxid in the presence of an excess of metallic copper while maintaining said pulp at a temperature approximately that of boiling water, thereby forming cupro-cupric sulfite and subjecting the pulp to flotation, thereby removing the cupro-cupric sulfite and the excess of copper in admixture.

23. The process of treating copper ores which consists in forming a thick aqueous pulp thereof, subjecting said pulp to the action of sulfur dioxid in the presence of metallic copper while maintaining said pulp at a temperature approximately that of boiling water, removing the excess of sulfur dioxid from the pulp, and separating the cupro-cupric sulfite therefrom.

24. The process of treating copper ores which consists in forming a thick aqueous pulp thereof, subjecting said pulp to the action of sulfur dioxid in the presence of metallic copper while maintaining said pulp at a temperature approximately that of boiling water, passing steam through the pulp, thereby removing the excess of sulfur dioxid therefrom, and separating the cupro-cupric sulfite.

NIELS C. CHRISTENSEN.

Witnesses:
THEODORE STEBBINS,
MARY WOOD.